(12) United States Patent
Johnson et al.

(10) Patent No.: US 7,376,686 B2
(45) Date of Patent: May 20, 2008

(54) APPARATUS AND METHOD FOR GENERATING PACKED SUM OF ABSOLUTE DIFFERENCES

(75) Inventors: Daniel W. J. Johnson, Round Rock, TX (US); Albert J. Loper, Austin, TX (US)

(73) Assignee: VIA Technologies, Inc. (TW)

( * ) Notice: Subject to any disclaimer, the term of this patent is extended or adjusted under 35 U.S.C. 154(b) by 660 days.

(21) Appl. No.: 10/765,497

(22) Filed: Jan. 27, 2004

(65) Prior Publication Data
US 2004/0199751 A1   Oct. 7, 2004

Related U.S. Application Data

(60) Provisional application No. 60/444,531, filed on Jan. 31, 2003.

(51) Int. Cl.
*G06F 7/00* (2006.01)
(52) U.S. Cl. ...................................... 708/201
(58) Field of Classification Search ................. 708/201
See application file for complete search history.

(56) References Cited

U.S. PATENT DOCUMENTS

| 5,610,850 | A | * | 3/1997 | Uratani et al. | .............. 708/671 |
| 5,694,348 | A | | 12/1997 | Guttag et al. | |
| 5,742,529 | A | * | 4/1998 | Mennemeier et al. | ....... 708/201 |
| 5,880,979 | A | * | 3/1999 | Mennemeier et al. | ....... 708/201 |
| 6,377,970 | B1 | | 4/2002 | Abdallah et al. | |
| 7,054,895 | B2 | * | 5/2006 | Koba et al. | ................. 708/201 |

OTHER PUBLICATIONS

"Intel Architecture Software Developer's Manual";1999; (Pentium II) vol. 2 Instruction Set Reference; pp. 3-545 through 3-547.

* cited by examiner

*Primary Examiner*—Tan V. Mai
(74) *Attorney, Agent, or Firm*—E. Alan Davis; James W. Huffman

(57) ABSTRACT

An apparatus for performing an MultiMedia extension (MMX) Packed Sum of Absolute Differences (PSADBW) instruction is disclosed. The apparatus includes carry-generating subtraction logic that generates packed differences of the subtrahend from the minuend and associated carry bits indicating whether the difference is positive or negative. The apparatus selectively inverts the differences based on the carry bits. Addition logic adds the selectively inverted differences and carry bits substantially in parallel to generate the PSADBW instruction result. In one embodiment, the apparatus also includes two muxes. The first mux selects the selectively inverted differences in the case of a PSADBW instruction and selects a multiply instruction's partial products otherwise. The second mux selects the carry bits in the case of a PSADBW instruction and selects a second multiply instruction's partial products otherwise. The two mux outputs are provided to the addition logic. In one embodiment, the microprocessor translates the PSADBW instruction into at least first and second microinstructions for execution.

6 Claims, 4 Drawing Sheets

Generation of Packed Sum of Absolute Differences

APPARATUS AND METHOD FOR GENERATING PACKED SUM OF ABSOLUTE DIFFERENCES

PRIORITY INFORMATION

This application claims priority based on U.S. Provisional Application, Ser. No. 60/444,531, filed Jan. 31, 2003, entitled APPARATUS AND METHOD FOR GENERATING PACKED SUM OF ABSOLUTE DIFFERENCES.

FIELD OF THE INVENTION

This invention relates in general to the field of arithmetic operations in microprocessors and particularly to the generation of packed sums of absolute differences.

BACKGROUND OF THE INVENTION

The x86 instruction set includes a PSADBW instruction. The PSADBW instruction includes two 64-bit input operands, each arranged as eight packed unsigned byte integers. One of the operands is a minuend operand of a subtraction operation and the other operand is a subtrahend operand of the subtraction operation. The PSADBW instruction generates an unsigned 16-bit result which is the sum of the absolute value of the eight differences of the corresponding eight unsigned byte integers when subtracting the subtrahend from the minuend. This particular result must be computed in various common applications, such as multimedia audio, video, or graphics applications, or scientific applications.

One approach to implementing the PSADBW instruction in a microprocessor is to generate the differences of the first and second packed operands, then take the absolute value of the differences, and then serially add the absolute values of the differences. However, this approach has the drawback of requiring a relatively large number of processor clock cycles to generate the result, particularly because the adds are performed serially. Therefore, what is needed is a fast apparatus for performing the PSADBW instruction.

SUMMARY

In one aspect, the present invention provides an apparatus that performs an MMX PSADBW instruction in a microprocessor with an MMX unit. The apparatus includes carry-generating packed subtraction logic that subtracts the packed unsigned subtrahend operand from the packed unsigned minuend operand to generate packed differences and a carry bit associated with each difference. A Boolean one carry bit indicates the difference is negative and a Boolean zero carry bit indicates the difference is positive. The apparatus includes a mux for each difference that selects the difference if the carry is a zero (i.e., is positive) or its complement if the carry is a one (i.e., is negative). The selectively inverted differences and the carry bits are added in parallel to produce the instruction result. In the case of a negative difference, by adding the Boolean one carry bit to the inverse of the difference, the absolute value of the difference is obtained. In the case of a positive difference, by adding the Boolean zero carry bit to the non-inverted difference, the absolute value of the difference is obtained. Advantageously, the absolute value computation is accomplished substantially in parallel with the addition of the selectively inverted differences and carry bits to perform a fast PSADBW result.

In one embodiment, the MMX unit includes two 16-bit multiplier pipelines. The multiplier pipelines each include a partial product generator that generates nine partial products by Booth encoding. Addition logic of the apparatus includes a carry-save adder in each multiplier pipeline for adding the partial products to generate a sum. The addition logic also includes a full adder for adding the two sums from the two multiplies. The apparatus includes a mux in each multiplier pipeline that selects multiplier partial products for provision to the addition logic in the case of a multiply instruction. However, in the case of a PSADBW instruction, the muxes select the selectively inverted differences and the carry bits for provision to the addition logic.

In one embodiment, the microprocessor translates the PSADBW macroinstruction into first and second microinstructions for execution by the microprocessor's MMX unit.

DETAILED DESCRIPTION

Figure 1:
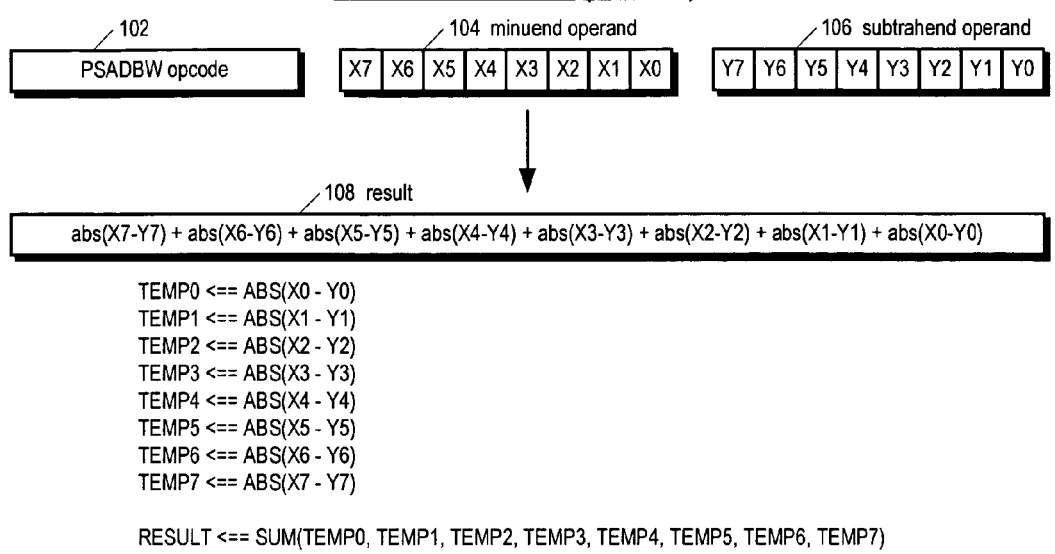
FIG. 1 is a block diagram illustrating a prior art block diagram of the MMX PSADBW instruction.

Referring now to FIG. 1, a block diagram illustrating a prior art block diagram of the MMX PSADBW instruction 100 is shown. The MMX PSADBW instruction 100 includes an instruction opcode 102 uniquely specifying the PSADBW instruction 100, and two instruction operands 104 and 106. The first operand 104 comprises a minuend operand of eight packed unsigned bytes denoted X0 through X7. The second operand 106 comprises a subtrahend operand of eight packed unsigned bytes denoted Y0 through Y7. The instruction 100 generates a result 108 which is the sum of the absolute value of the eight differences of the corresponding eight unsigned byte integers of the minuend operand 104 and the subtrahend operand 106. The PSADBW instruction is described in detail in the 1999 Intel® Architecture Software Developer's Manual, Volume 2: Instruction Set Reference, at pages 3-545 through 3-547, which are hereby incorporated by reference.

Figure 2:
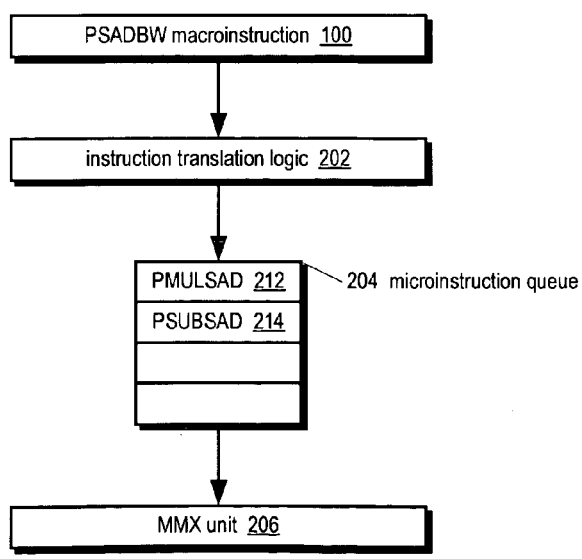
FIG. 2 is a block diagram illustrating a microprocessor for executing a PSADBW instruction according to the present invention.

Referring now to FIG. 2, a block diagram illustrating a microprocessor 200 for executing a PSADBW instruction according to the present invention is shown. The microprocessor 200 includes instruction translation logic 202, a microinstruction queue 204 coupled to the instruction translation logic 202, and an MMX unit 206 coupled to the microinstruction queue 204.

The instruction translation logic 202 translates a macroinstruction, such as the PSADBW macroinstruction 100 of FIG. 1, into one or more microinstructions. In one embodiment, the macroinstructions comprise instructions of the x86 instruction set, such as MMX instructions. In one embodiment, the instruction translation logic 202 translates a PSADBW instruction 100 into two microinstructions, denoted PMULSAD 212 and PSUBSAD 214 in FIG. 2. The PSUBSAD microinstruction 214 instructs the MMX unit 206 to generate the differences of the packed PSADBW operands, to generate the carry bit of each of the differences, and to selectively invert each of the differences based on the value of its associated carry bit. The PMULSAD microinstruction 212 instructs the MMX unit 206 to add the carry bits and selectively inverted differences to generate the PSADBW instruction result. The operation of the PSUBSAD 214 and PMULSAD 212 microinstructions is described in more detail below with respect to FIGS. 3 and 4.

The instruction translation logic 202 comprises logic, circuits, devices, or microcode (i.e., microinstructions or native instructions), or a combination of logic, circuits, devices, or microcode, or equivalent elements that are employed to translate instructions into associated sequences of microinstructions. The elements employed to perform translation within the instruction translation logic 202 may be shared with other circuits, microcode, etc., that are employed to perform other functions within the microprocessor 200. A microinstruction (also referred to as a native instruction) is an instruction at the level that an execution unit executes, such as MMX unit 206. For example, microinstructions are directly executed by a reduced instruction set computer (RISC) microprocessor. For a complex instruction set computer (CISC) microprocessor such as an x86-compatible microprocessor, x86 instructions are translated into associated microinstructions, and the associated microinstructions are directly executed by a unit or units within the CISC microprocessor.

The microinstructions are provided by the instruction translation logic 202 to the microinstruction queue 204 for storage pending execution by execution units of the microprocessor 200, such as MMX unit 206. The microinstruction queue 204 has a plurality of microinstruction entries. Microinstructions are provided from the microinstruction queue 204 to execution units of the microprocessor 200, such as MMX unit 206.

In one embodiment, the MMX unit 206 includes an MMX register file having a plurality of registers for storing instruction operands, such as the PSADBW instruction minuend operand 104 and subtrahend operand 106 of FIG. 1. The MMX unit 206 executes the operations prescribed by microinstructions as passed down from previous stages of microprocessor 200. The MMX unit 206 comprises logic, circuits, devices, or microcode (i.e., microinstructions or native instructions), or a combination of logic, circuits, devices, or microcode, or equivalent elements that are employed to perform operations as prescribed by microinstructions provided thereto. The elements employed to perform the operations within the MMX unit 206 may be shared with other circuits, microcode, etc., that are employed to perform other functions within the microprocessor 200. In one embodiment, the MMX unit 206 operates in parallel to other execution units such as an integer unit, floating point unit, etc. In one embodiment that is compatible with the x86 architecture, the MMX unit 206 operates in parallel with an x86 integer unit, an x86 floating point unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the MMX unit 206 operating in parallel with a subset of the aforementioned x86 execution units. The MMX unit 206 is described in more detail with respect to FIGS. 3 and 4 below.

Figure 3:
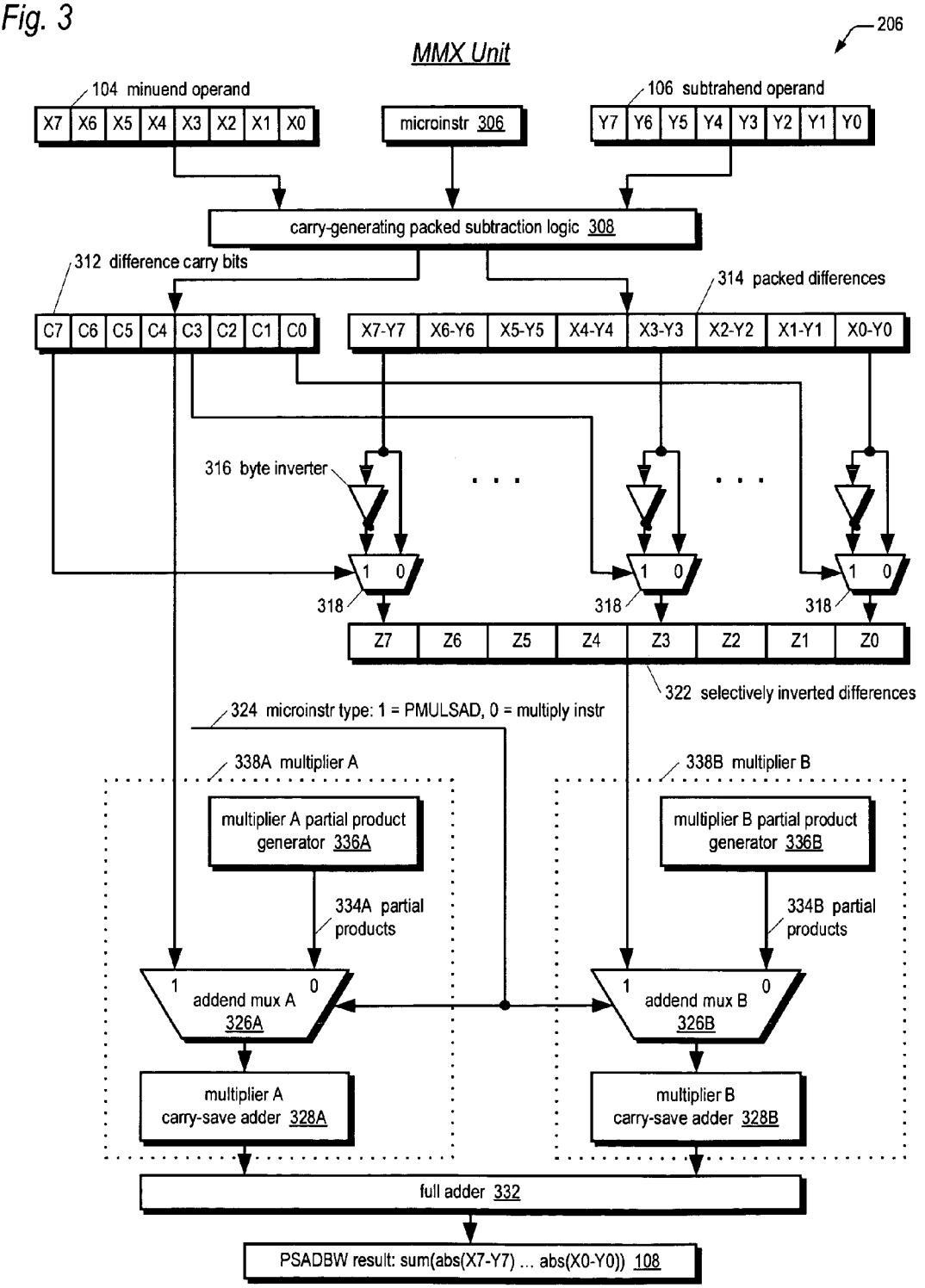
FIG. 3 is a block diagram illustrating the MMX unit of FIG. 2 according to the present invention.

Referring now to FIG. 3, a block diagram illustrating the MMX unit 206 of FIG. 2 according to the present invention is shown. The MMX unit 206 includes carry-generating packed subtraction logic 308 that receives a microinstruction 306, such as a PMULSAD 212 or PSUBSAD 214 microinstruction, from the microinstruction queue 204 of FIG. 2. The subtraction logic 308 also receives the PSADBW instruction minuend operand 104 and the subtrahend operand 106 of FIG. 1. The subtraction logic 308 includes subtractors that generate packed unsigned byte differences 314 for each of the corresponding packed unsigned byte minuend/subtrahend pairs. The differences 314 are denoted X7-Y7 through X0-Y0 in FIG. 3. The differences 314 are generated using two's complement arithmetic.

The subtraction logic 308 also generates carry bits 312 for each of the differences 314. The carry bits 312 are referred to as C7 through C0 in FIG. 3. In one embodiment, the carry bits 312 are stored in storage elements, such as latches or registers. The carry bits 312 are also referred to as borrow bits, or underflow bits, or sign bits, since they indicate whether a borrow from what would be the ninth bit of the minuend 104 was required and indicate whether the associated difference 314 is positive or negative. For each of the differences 314, its associated carry bit 312 is a Boolean value one (1) if the difference 314 is negative and is a Boolean value zero (0) if the difference 314 is positive. For example, assume the minuend X4 104 is $13_{10}$, or $00001101_2$ and the subtrahend Y4 106 is $9_{10}$, or $00001001_2$. Then the difference X4-Y4 314 is $4_{10}$, or $00000100_2$, and the carry bit C4 312 is 0 because no borrow was necessary. That is, the carry bit C4 312 indicates that the difference X4-Y4 314 is positive, and the difference X4-Y4 314 is also the absolute value of the difference X4-Y4 314. However, assume the minuend X4 104 is $9_{10}$, or 000010012 and the subtrahend Y4 106 is $13_{10}$, or $00001101_2$. Then the difference X4-Y4 314 is $-4_{10}$, or $11111100_2$, and the carry bit C4 312 is 1 because a borrow was necessary. That is, the carry bit C4 312 indicates that the difference X4-Y4 314 is negative, and the difference X4-Y4 314 is not the absolute value of the difference X4-Y4 314. In order to obtain the absolute value of the difference X4-Y4 314, according to two's complement arithmetic, the difference 314 must be inverted and have 1 added to it. In the example, inverting the difference 314 and adding 1 would yield $00000100_2$, or $4_{10}$, which is the absolute value of the difference $-4^{10}$, or $11111100_2$.

The MMX unit 206 also includes eight byte inverters 316, each coupled to receive a corresponding one of the packed differences 314 and generates a Boolean complement, or inverse, thereof.

The MMX unit 206 also includes eight two-input multiplexers 318, each coupled to a corresponding one of the byte inverters 316. Each multiplexer 318 receives the output of its corresponding inverter 316 on one input and receives the corresponding difference 314 on its other input. Each multiplexer 318 receives as its control input a corresponding carry bit 312. If the carry bit 312 is a Boolean zero, then the multiplexer 318 selects the difference 314 input; if the carry bit 312 is a Boolean one, then the multiplexer 318 selects the inverted difference 314 input from the inverter 316. Thus the output of the multiplexers 318 comprise eight selectively inverted differences 322 of the differences 314 generated by the subtraction logic 308. The selectively inverted differences 322 are denoted Z7 through Z0 322 in FIG. 3.

The MMX unit 206 also includes two 16-bit multiplier pipelines, referred to as multiplier A 338A and multiplier B 338B in FIG. 3. Each of the multipliers 338 includes a partial product generator, referred to in FIG. 3 as multiplier A partial product generator 336A and multiplier B partial product generator 336B, which generate multiplier A partial products 334A and multiplier B partial products 334B, respectively. In one embodiment, the partial product generators 336 comprise Booth encoders, each of which generates nine 16-bit partial products based on examination of 3 bits of the multiplier operand to generate each partial product. In one embodiment, the partial products also include additional bits, such as sign-extension bits. Hence, advantageously, at least eight of the partial products have at least eight bits of overlap during their addition.

The multipliers 338A and 338B also include two-input multiplexers, referred to as addend mux A 326A and addend mux B 326B, respectively, in FIG. 3. Addend mux A 326A receives on one input the partial products 334A from partial product generator 336A. Addend mux A 326A receives on its other input the carry bits 312. Addend mux B 326B receives on one input the partial products 334B from partial product generator 336B. Addend mux B 326B receives on its other input the selectively inverted differences 322. Each of the addend muxes 326 receives on its control input a microinstruction type signal 324, which indicates whether the microinstruction type is a PMULSAD microinstruction or a multiply instruction. If the microinstruction type 324 indicates a PMULSAD microinstruction is being executed, then addend mux 326A selects the carry bits 312 to output; otherwise, addend mux 326A selects the partial products 334A to output. If the microinstruction type 324 indicates a PMULSAD microinstruction is being executed, then addend mux 326B selects the selectively inverted differences 322 to output; otherwise, addend mux 326B selects the partial products 334B to output.

The multipliers 338A and 338B also include adders 328A and 328B, respectively. In one embodiment, the adders 328 comprise carry-save adders. Adder 328A receives the output of addend mux A 326A and adder 328B receives the output of addend mux B 326B. That is, adder 328A receives either the partial products 334A as addends for adding together or adder 328A receives the carry bits 312 for adding together, based on the value of the microinstruction type signal 324. Similarly, adder 328B receives either the partial products 334B as addends for adding together or adder 328B receives the selectively inverted differences 322 for adding together, based on the value of the microinstruction type signal 324. In one embodiment, advantageously, the adders 328 are configured to add at least nine addends, each comprising at least 16-bits. In particular, all of the addends overlap at least eight bits, and the sum generated by the adders 328 comprises 32 bits. In one embodiment, each of the adders 328 comprises a first row of 3:2 carry-save adders (CSAs) that reduce the nine partial products to six intermediate partial products, a second row of 3:2 CSAs that reduce the six partial products to four intermediate partial products, a third row of CSAs that reduces the four partial products to three partial products, and a fourth row of CSAs that reduce the three partial products to two intermediate partial products, comprising a carry and a sum.

MMX unit 206 also includes an adder 332 that receives the sums generated by adders 328A and 328B. In one embodiment, adder 332 comprises a full adder. Adder 332 adds the sums received from adders 328A and 328B and adds them to generate a final sum, which is the result 108 of the PSADBW instruction if the microinstruction type signal 324 indicated a PMULSAD microinstruction, or otherwise the sum of products of two 16-bit multiplies. In one embodiment, if the desired result is a 16-bit multiply product result, then a zero value is muxed into one of the inputs of adder 332 (i.e., the input that is not from the multiplier performing the 16-bit multiply) to generate a final 16-bit multiply product. In one embodiment, the two multipliers 338 operate in conjunction along with adder 332 to perform a 32-bit multiply.

Figure 5:
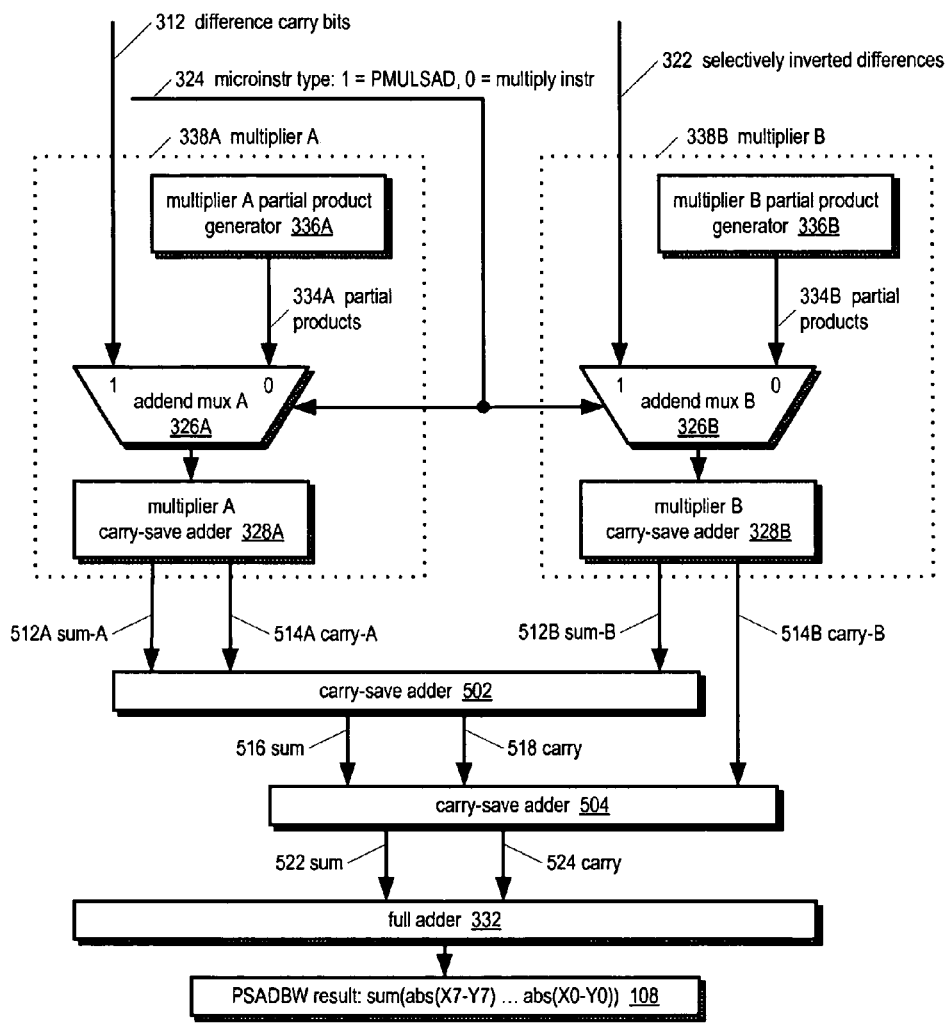
FIG. 5 is a block diagram illustrating the MMX unit of FIG. 2 according to an alternate embodiment of the present invention.

In one embodiment, the MMX unit 206 also includes two carry-save adders (not shown) that reduce the sum and carry from adder 328A and sum and carry from adder 328B to a single sum and carry that are provided to full adder 332, which generates the single final sum 108. This embodiment is illustrated in FIG. 5.

As may be seen from the foregoing description, advantageously the generation of the absolute value of each of the packed differences 314 is accomplished concurrently with the addition of the differences 314 by virtue of the concurrent addition of the carry bits 312 and the selectively inverted differences 322. That is, if a given difference 314 is negative, the absolute value is accomplished by selecting the inverse of the difference 314 by the multiplexer 318, and then effectively adding the carry bit 312, (which is a Boolean one if the difference 314 is negative) to the inverted difference, since the carry bit 312 will have a Boolean one value if the inverted difference is selected as the selectively inverted difference 322. Conversely, if a given difference 314 is positive, the absolute value is accomplished by selecting the non-inverted difference 314 by the multiplexer 318, and then effectively adding the carry bit 312, (which is a Boolean zero if the difference 314 is positive) to the non-inverted difference 314, since the carry bit 312 will have a Boolean zero value if the non-inverted difference 314 is selected as the selectively inverted difference 322. Advantageously, the addition of the carry bits 312 and the selectively inverted differences 322 is performed in parallel, rather than generating the absolute values of the differences and then serially adding the absolute values, thereby producing a fast PSADBW instruction result.

Figure 4:
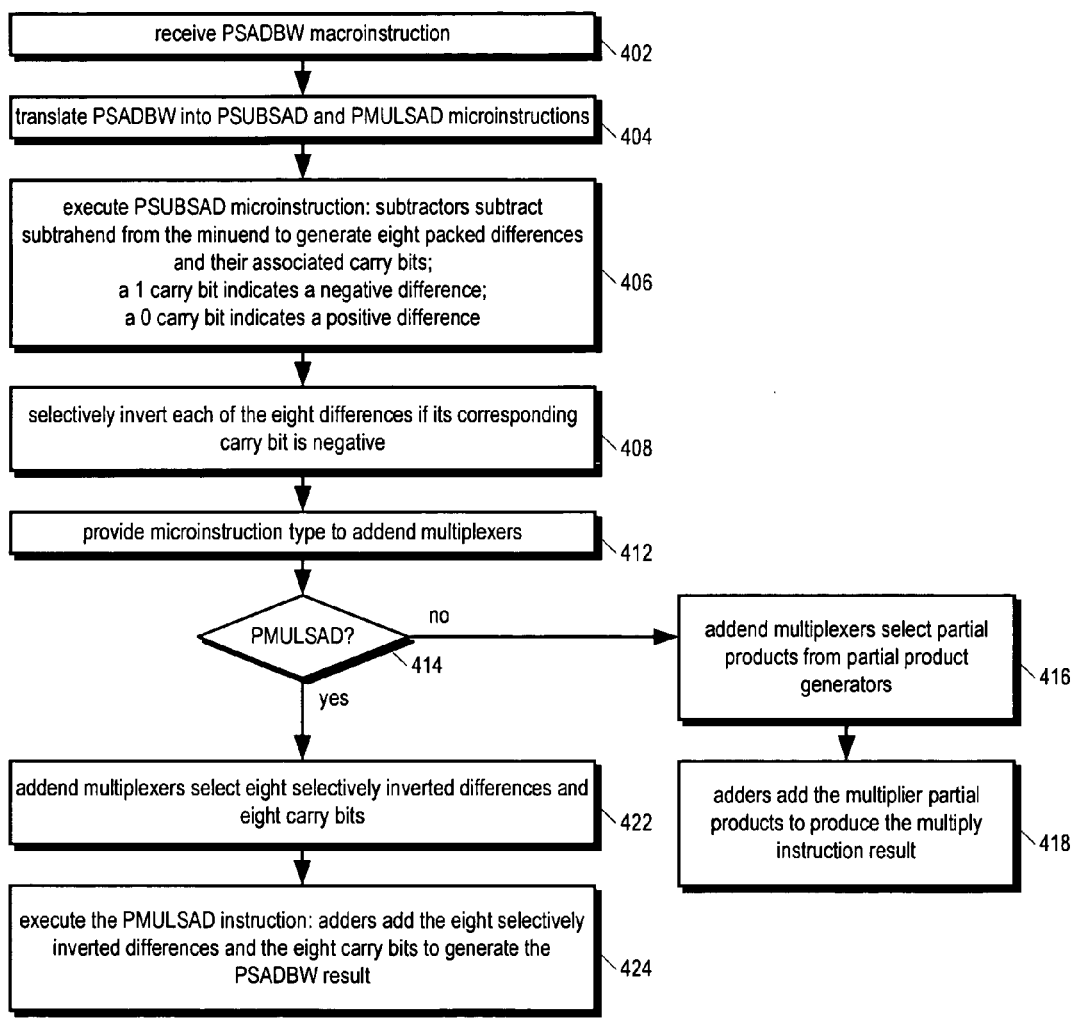
FIG. 4 is a flowchart illustrating operation of the microprocessor of FIG. 2 to perform a PSADBW instruction according to the present invention.

Referring now to FIG. 4, a flowchart illustrating operation of the microprocessor 200 of FIG. 2 to perform a PSADBW instruction according to the present invention is shown. Flow begins at block 402.

At block 402, the microprocessor 200 fetches a PSADBW macroinstruction 100 of FIG. 1. Flow proceeds to block 404.

At block 404, the instruction translation logic 202 of FIG. 2 translates the PSADBW instruction into PSUBSAD 214 and PMULSAD 212 microinstructions, which are stored into the microinstruction queue 204 and forwarded to the MMX unit 206 of FIG. 2. Flow proceeds to block 406.

At block 406, the MMX unit 206 executes the PSUBSAD microinstruction 214. In particular, in response to the PSUBSAD microinstruction 214, the subtractors in the subtraction logic 308 of FIG. 3 subtract the subtrahend 106 from the minuend 104 to generate eight packed differences 314 and their associated carry bits 312 of FIG. 3. A Boolean one carry bit 312 value indicates a negative difference, whereas a Boolean zero carry bit 312 value indicates a positive difference. Flow proceeds to block 408.

At block 408, the byte inverters 316 invert the differences 314 and the muxes 318 select the inverted difference if the corresponding carry bit 312 is a Boolean one and select the difference 314 if the carry bit 312 is a Boolean zero to generate the selectively inverted differences 322 of FIG. 3. Flow proceeds to block 412.

At block 412, the microinstruction type 324 is provided to the addend muxes 326 of FIG. 3. Flow proceeds to decision block 414.

At block 414, the addend muxes 326 determine whether the microinstruction type 324 is a PMULSAD microinstruction 212. If so, flow proceeds to block 422; otherwise, flow proceeds to block 416.

At block 416, the addend muxes 326 select the partial products 334 from the partial product generators 336 of FIG. 3. Flow proceeds to block 418.

At block 418, the adders 328 and 332 of FIG. 3 add the partial products 334 to produce the multiply instruction result. Flow ends at block 418.

At block 422, the addend muxes 326 select the eight selectively inverted differences 322 and the eight carry bits 312. Flow proceeds to block 424.

At block 424, the adders 328 and 332 add the eight selectively inverted differences 322 and the eight carry bits 312 to produce the PSADBW 100 instruction result 108. Flow ends at block 424.

Referring now to FIG. 5, a block diagram illustrating the MMX unit 206 of FIG. 2 according to an alternate embodiment of the present invention is shown. The MMX unit 206 of FIG. 5 is similar to the embodiment of FIG. 3 and corresponding elements are numbered alike. However, the MMX unit 206 of FIG. 5 also includes a carry-save adder 502 that receives a sum output 512A and carry output 514A of multiplier A carry-save adder 328A and a sum output 512B of multiplier B carry-saver adder 328B, which the carry-save adder 502 adds to generate a sum 516 and a carry 518. Additionally, the MMX unit 206 of FIG. 5 also includes a carry-save adder 504 that receives a carry output 514B of multiplier B carry-save adder 328B and sum output 516 and carry output 518 of carry-save adder 502, which the carry-save adder 504 adds to generate a sum 522 and a carry 524. The full adder 332 receives the sum 522 and carry 524 generated by carry-save adder 504, which full adder 332 adds to generate the result 108.

As may be seen from the foregoing description, the present invention advantageously performs the PSADBW instruction in two microinstruction cycles. In one embodiment, the PSADBW macroinstruction 100 is performed in four core clock cycles of the microprocessor 200. That is, the MMX unit 206 performs the packed subtraction and selective inversion of the differences according to the PSUBSAD microinstruction 214 in a single core clock cycle and performs the addition of the carry bits 312 and selectively inverted differences 322 according to the PMULSAD microinstruction 212 in three core clock cycles.

As may be seen from the foregoing description, the multiplexers 326 enable the MMX unit 206 to advantageously employ the adders 328 and 332 to selectively perform the PSADBW and multiply instructions, thereby potentially reducing the total amount of circuitry needed to perform multiple instructions through reuse of common circuitry.

Although the present invention and its objects, features and advantages have been described in detail, other embodiments are encompassed by the invention. For example, although embodiments have been described with respect to a 64-bit packed operand version of the MMX PSADBW instruction, embodiments are contemplated in which the apparatus is extended to a version of the PSADBW that operates on 128-bit packed operands. Furthermore, although the invention has been described with respect to Boolean zero and Boolean one values, the Boolean values may be represented in various ways within the circuit elements, in particular using different logic level and voltage or current conventions, without departing from the scope of the invention. Finally, the microprocessor may include multiple MMX execution units.

Also, in addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for executing an MMX PSADBW instruction, comprising:
   subtractors, for generating packed differences of packed operands of the instruction and for generating borrow bits associated with each of the packed differences;
   inverters, coupled to said subtraction logic, for generating an inverse of each of said packed differences;
   multiplexers, coupled to said inverters and said subtraction logic, each for selecting as an output said packed difference if said associated borrow bit indicates the packed difference is positive, and for selecting as said output said inverse if said associated borrow bit indicates the packed difference is negative; and
   a first adder, coupled to said multiplexers, configured to add said outputs of said multiplexers to generate a first sum and a first carry;
   a second adder, coupled to said subtractors, configured to add said borrow bits to generate a second sum and a second carry in parallel with said first adder generating said first sum and carry;
   a third adder, coupled to said first and second adders, configured to add said first and second sums and carries to generate a result of the PSADBW instruction.

2. The apparatus of claim 1, further comprising:
   an instruction type input, for specifying whether the PSADBW instruction or a multiply instruction is being executed by the apparatus; second multiplexers, coupled to said first adder, configured to provide said outputs of said first multiplexers to said first adder if said instruction type specifies the PSADBW instruction and to provide a first set of partial products to said first adder if said instruction type specifies the multiply instruction; and third multiplexers, coupled to said second adder, configured to provide said borrow bits to said second adder if said instruction type specifies the PSADBW instruction and to provide a second set of partial products to said second adder if said instruction type specifies the multiply instruction.

3. The apparatus of claim 2, wherein said third adder is also selectively employed to generate a sum of first and second product results generated by said first and second adders, rather than said result of the PSADBW instruction, if said instruction type specifies the multiply instruction.

4. The apparatus of claim 1, wherein each of said borrow bits comprises a Boolean zero value if said associated packed difference is positive and comprises a Boolean one value if said associated packed difference is negative.

5. The apparatus of claim 1, further comprising:
a plurality of storage elements, for storing said borrow bits.

6. The apparatus of claim 1, wherein said third adder comprises:
a fourth adder, for adding said second sum and said second carry and said first sum to generate a third sum and third carry;
a fifth adder, for adding said third sum and said third carry and said first carry to generate a fourth sum and a fourth carry; and
a sixth adder, for adding said fourth sum and said fourth carry to generate said result.

* * * * *